(12) United States Patent
Tripathy et al.

(10) Patent No.: US 10,783,118 B2
(45) Date of Patent: Sep. 22, 2020

(54) READ-ONLY FILE SYSTEM FOR TESTING DE-DUPLICATION

(71) Applicant: Dell Software, Inc., Round Rock, TX (US)

(72) Inventors: Tarun Tripathy, Newark, CA (US); Brian Smith, San Ramon, CA (US)

(73) Assignee: QUEST SOFTWARE INC., Aliso Viejo, CA (US)

(*) Notice: Subject to any disclaimer, the term of this patent is extended or adjusted under 35 U.S.C. 154(b) by 342 days.

(21) Appl. No.: 15/009,617

(22) Filed: Jan. 28, 2016

(65) Prior Publication Data
US 2017/0220593 A1    Aug. 3, 2017

(51) Int. Cl.
*G06F 16/00* (2019.01)
*G06F 16/174* (2019.01)

(52) U.S. Cl.
CPC ...... *G06F 16/1748* (2019.01); *G06F 16/1744* (2019.01)

(58) Field of Classification Search
CPC ......... G06F 17/30156; G06F 17/30082; G06F 17/30; G06F 16/1748
See application file for complete search history.

(56) References Cited

U.S. PATENT DOCUMENTS

| | | | | |
|---|---|---|---|---|
| 9,569,453 | B1* | 2/2017 | Rakshe | G06F 11/3414 |
| 2007/0162515 | A1* | 7/2007 | Sarma | G06F 16/10 |
| 2008/0104315 | A1* | 5/2008 | Hall | G06F 3/0659 |
| | | | | 711/112 |
| 2009/0271454 | A1* | 10/2009 | Anglin | G06F 11/1453 |
| 2013/0262801 | A1* | 10/2013 | Sancheti | G06F 3/0619 |
| | | | | 711/162 |
| 2013/0339315 | A1* | 12/2013 | Stoakes | G06F 3/0641 |
| | | | | 707/692 |
| 2014/0032601 | A1* | 1/2014 | Kanigicherla | G06F 16/176 |
| | | | | 707/781 |
| 2014/0047202 | A1* | 2/2014 | Vellore | G06F 3/067 |
| | | | | 711/162 |
| 2015/0074064 | A1* | 3/2015 | Goldberg | G06F 16/1724 |
| | | | | 707/692 |
| 2016/0078068 | A1* | 3/2016 | Agrawal | G06F 11/1464 |
| | | | | 707/692 |
| 2016/0124663 | A1* | 5/2016 | Mitkar | G06F 16/1734 |
| | | | | 711/162 |
| 2016/0140139 | A1* | 5/2016 | Torres | G06Q 10/10 |
| | | | | 707/610 |

(Continued)

*Primary Examiner* — Usmaan Saeed
*Assistant Examiner* — David M Nafziger
(74) *Attorney, Agent, or Firm* — Maschoff Brennan (57) ABSTRACT

Disclosed herein are systems, methods, and devices for testing deduplication repositories. Methods may include identifying a storage location based on a request for one or more data values associated with a read-only file system, where the read-only file system is a simulated file system, and where the storage location is identified based on a plurality of request parameters included in the request. The methods may also include generating, using a processor and responsive to the request, the one or more data values based on the plurality of request parameters and a plurality of configuration parameters, where the plurality of configuration parameters enable deterministic generation of all data values stored in the tile system. The methods may further include returning the one or more data values as a result of the request.

11 Claims, 7 Drawing Sheets

(56) References Cited

U.S. PATENT DOCUMENTS

| | | | |
|---|---|---|---|
| 2016/0147785 A1* | 5/2016 | Thirumal | G06F 3/0641 |
| | | | 707/692 |
| 2016/0275096 A1* | 9/2016 | Butt | G06F 16/1748 |
| 2016/0378450 A1* | 12/2016 | Fu | G06F 8/61 |
| | | | 717/177 |
| 2017/0068459 A1* | 3/2017 | Colvig | G06F 3/0608 |
| 2017/0329543 A1* | 11/2017 | Slater | G06F 12/16 |

* cited by examiner

READ-ONLY FILE SYSTEM FOR TESTING DE-DUPLICATION

TECHNICAL FIELD

The present disclosure relates generally to de-duplication of data, and more specifically to testing de-duplication systems.

DESCRIPTION OF RELATED ART

Data is often stored in storage systems that are accessed via a network. Network-accessible storage systems allow potentially many different client devices to share the same set of storage resources. A network-accessible storage system can perform various operations that render storage more convenient, efficient, and secure. For instance, a network-accessible storage system can receive and retain potentially many versions of backup data for files stored at a client device. As well, a network-accessible storage system can serve as a shared file repository for making a file or files available to more than one client device.

Some data storage systems may perform operations related to data deduplication. In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Parsing may identify a chunk in various different input streams. Given that the same byte pattern may occur dozens, hundreds, or even thousands of times, the amount of data that must be stored or transferred can be greatly reduced. The match frequency may depend at least in part on the chunk size. Different storage systems may employ different chunk sizes or may support variable chunk sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain 100 instances of the same one megabyte (MB) file attachment. In conventional backup systems, each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Disclosed herein are systems, methods, and devices for testing deduplication repositories. Methods may include identifying a storage location based on a request for one or more data values associated with a read-only file system, where the read-only file system is a simulated file system, and where the storage location is identified based on a plurality of request parameters included in the request. The methods may also include generating, using a processor and responsive to the request, the one or more data values based on the plurality of request parameters and a plurality of configuration parameters, where the plurality of configuration parameters enable deterministic generation of all data values stored in the file system. The methods may further include returning the one or more data values as a result of the request.

In some embodiments, the read-only file system is a simulated file system that simulates data stored in a test file system, and the one or more data values are not stored in the read-only file system at the time the request is made. In various embodiments, the configuration parameters identify a compression ratio, a deduplication rate, and a total data size associated with the file system, and the one or more data values are generated dynamically and based on a seed specific to the file system. According to some embodiments, the one or more data values are generated utilizing a deterministic function. In some embodiments, the deterministic function is configured based on a designated deduplication rate and a designated data offset associated with the read-only file system. In various embodiments, the deterministic function is configured to generate the one or more data values based on the compression ratio, the deduplication rate, and the seed. According to some embodiments, the methods may also include receiving the plurality of configuration parameters at a client machine. In some embodiments, at least some of the plurality of configuration parameters are randomly selected. In various embodiments, the returning of the one or more data values further includes providing the one or more data values to a deduplication repository. According to some embodiments, the methods may also include verifying data stored in the deduplication repository based on the one or more data values.

Also disclosed herein are devices that may include a communications interface configured to be communicatively coupled with a deduplication repository, and one or more processors configured to implement a read-only file system. The one or more processors may be configured to identify a storage location based on a request for one or more data values associated with a read-only file system, where the read-only file system is a simulated file system, and where the storage location is identified based on a plurality of request parameters included in the request. The one or more processors may be further configured to generate, responsive to the request, the one or more data values based on the plurality of request parameters and a plurality of configuration parameters, where the plurality of configuration parameters enable deterministic generation of all data values stored in the file system. The one or more processors may also be configured to return the one or more data values as a result of the request.

In sonic embodiments, the read-only file system is a simulated file system that simulates data stored in a test file system, where the one or more data values are not stored in the read-only file system at the time the request is made, where the configuration parameters identify a compression ratio, a deduplication rate, and a total data size associated with the file system, and where the one or more data values are generated dynamically and based on a seed specific to the file system. In various embodiments, the one or more data values are generated utilizing a deterministic function, where the deterministic function is configured to generate the one or more data values based on the compression ratio, the deduplication rate, and the seed. According to some embodiments, the deterministic function is configured based on a designated deduplication rate and a designated data offset associated with the read-only file system. In sonic embodiments, the one or more processors are further configured to provide the one or more data values to a deduplication repository.

Further disclosed herein are systems that may include a deduplication repository, a deduplication protocol engine, a client machine comprising one or more processors configured to implement a read-only file system. The one or more processors may be configured to identify a storage location based on a request for one or more data values associated with a read-only file system, where the read-only file system is a simulated file system, and where the storage location is identified based on a plurality of request parameters included in the request. The one or more processors may be further configured to generate, responsive to the request, the one or more data values based on the plurality of request parameters and a plurality of configuration parameters, where the plurality of configuration parameters enable deterministic generation of all data values stored in the file system. The one or more processors may also be configured to return the one or more data values as a result of the request.

In some embodiments, the configuration parameters identify a compression ratio, a deduplication rate, and a total data size associated with the file system, and the one or more data values are generated dynamically and based on a seed specific to the file system. In various embodiments, the one or more data values are generated utilizing a deterministic function, where the deterministic function is configured to generate the one or more data values based on the compression ratio, the deduplication rate, and the seed. According to some embodiments, the deterministic function is configured based on the deduplication rate and a designated data offset associated with the read-only file system. In some embodiments, the deduplication repository and the deduplication protocol engine are configured to verify data stored in the deduplication repository based on the one or more data values.

BRIEF DESCRIPTION OF THE DRAWINGS

The disclosure may best be understood by reference to the following description taken in conjunction with the accompanying drawings, which illustrate particular embodiments of the present disclosure.

DESCRIPTION OF PARTICULAR EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques and mechanisms of the present disclosure will be described in the context of particular data storage mechanisms. However, it should be noted that the techniques and mechanisms of the present disclosure apply to a variety of different data storage mechanisms. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

As discussed above, file systems may be backed up and stored in storage systems. Moreover, such backing up of data may include storage systems capable of implementing various deduplication protocols to compress the backed up data. Such storage systems may be referred to herein as deduplication repositories. When implemented, such deduplication repositories may be capable of storing backups of file systems that may exceed numerous terabytes in size. To test the performance of such deduplication repositories, a test file system may be populated and used to provide a data stream of data to the deduplication repository that is being tested. The deduplication repository may backup the data stored in the test file system, and then the backup may be restored and verified to assess the deduplication repository's sanity, or consistency with an expected functionality, under various conditions. The performance of the deduplication repository server is evaluated during backup by evaluating, for example, how fast the deduplication repository is able to ingest the data. However, conventional testing systems typically require population of the entire test file system prior to testing of the deduplication repository that will be used to back up the test file system. Accordingly, such population of a test file system may take a large amount of time, such as several days, may also require a tremendous amount of storage space in the test system, such as several terabytes, has a significantly high cost to build, and the general backing up process may be limited by bandwidth of the hard drives themselves.

Various embodiments disclosed herein generate test file systems that may be used to test deduplication repositories without utilizing a large amount of time, large amount of storage space, or without being limited by hard drive bandwidth. As will be discussed in greater detail below, a test machine, which may be a client machine, may include one or more components, such as an output generator, that may be configured to generate and provide requested data blocks (which may be provided in the form of a continuous data stream) to a deduplication repository as part of a testing process. As will be discussed in greater detail below, the data may be generated based on request parameters and configuration parameters that may be used to deterministically generate all data values stored in the test file system. Accordingly, data included in a test file system may be generated dynamically and on the fly, and data blocks may be dynamically generated and provided to a deduplication repository responsive to data requests. Accordingly, as disclosed herein, due to, among other things, the deterministic and dynamic generation of the data included in the test file system, the test file system may be implemented as a simulated file system, and performance of a deduplication repository may be tested without utilizing a large amount of time as well as physical and costly storage space to first populate a test file system, as well as without bandwidth limits imposed by hard drive access speeds.

Example Embodiments

Figure 1:
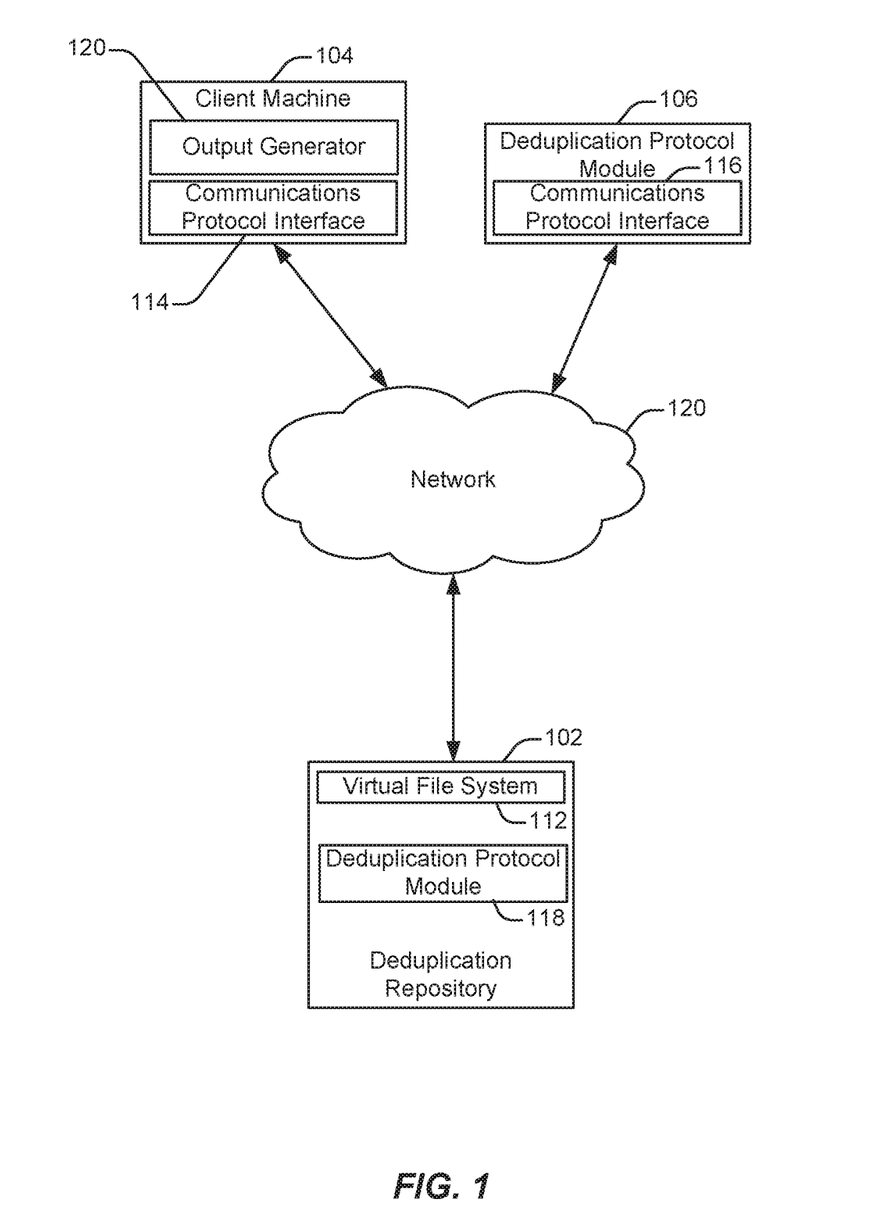
FIG. 1 illustrates an example of a system for testing a deduplication repository, configured in accordance with some embodiments.

FIG. 1 illustrates an example of a system for testing a deduplication repository, configured in accordance with sonic embodiments. The arrangement shown in FIG. 1 includes deduplication repository 102 in communication with one or more other system components, which may be devices, such as client machine 104 and deduplication protocol engine 106. In some embodiments, client machine 104 and deduplication protocol engine 106 are configured to communicate with deduplication repository 102 via communications protocol interfaces 114 and 116. As will be discussed in greater detail below, deduplication repository 102 may be a networked storage system that may be used to store data in a file system. Furthermore, deduplication of data stored in deduplication repository 102 may be managed by a component, such as deduplication protocol engine 106.

According to various embodiments, deduplication repository 102, client machine 104, and deduplication protocol engine 106 shown in FIG. 1 may communicate via network 120. In sonic embodiments, network 120 may include any nodes or links for facilitating communication between the end points. For instance, network 120 may include one or more WANs, LANs, MANs, WLANs, or any other type of communication linkage.

In some implementations, deduplication repository 102 may be any network-accessible device or combination of devices configured to store information received via a communications link. For instance, deduplication repository 102 may include one or more DR4000 or DR6000 series of storage appliances provided by Dell Computer of Round Rock, Tex. Although FIG. 1 shows one deduplication repository, other arrangements or configurations may include any number of deduplication repositories. For instance, corporate networks often include many deduplication repositories in communication with client devices and/or other networked storage systems through a network 120. In other embodiments, such multiple networked deduplication repositories may by in direct communication with client devices and/or other networked storage systems through direct communications links.

In some embodiments, deduplication repository 102 may be operable to provide one or more storage-related services in addition to simple file storage. For instance, deduplication repository 102 may be configured to implement a backup application configured to implement various backup operations, such as the generation of data requests and data stream generation. In some embodiments, such a backup application may be implemented elsewhere, such as in client machine 104 discussed in greater detail below. Deduplication repository 102 may also be configured to provide deduplication services for data stored on the storage system. Alternately, or additionally, deduplication repository 102 may be configured to provide backup-specific storage services for storing backup data received via a communication link.

Deduplication protocol engine 106 may be configured to implement one or more deduplication protocols to data being stored in deduplication repository 102. For example, deduplication protocol engine 106 may be configured to receive a stream of data, and may be further configured to reduce or minimize redundancies in the received data. For example, deduplication protocol engine 106 may be configured receive an incoming data stream, identify duplicate copies of repeated data within a received data stream, and generate an output data stream by removing at least some of the identified duplicate data. Accordingly, the output data stream generated by deduplication protocol engine 106 may be a compressed representation of the data stream that was initially received. Deduplication protocol engine 106 may be configured to implement such deduplication in accordance with one or more identified or designated deduplication percentages and/or compression ratios. In various embodiments, a deduplication percentage may characterize or determine a percent of duplicate data files would be present if an entire file system were to be represented. Moreover, a compression ratio may characterize or determine how compressible a data file is when ingested into a deduplication system. Such percentages and ratios may be designated by an entity, such as a system administrator. In various embodiments, deduplication protocol engine 106 may receive numerous streams of data from various different sources and apply deduplication protocols to one or more of the received data streams. In some embodiments, deduplication protocol engine 106 may be communicatively coupled with other system components, such as deduplication repository 102, via network 120.

In some embodiments, a deduplication protocol engine may be implemented within deduplication repository 102. For example, a deduplication protocol engine may be implemented as deduplication protocol engine 118. As similarly discussed above, deduplication protocol engine 118 may receive various streams of data from various different sources via a communications network, such as network 120. Moreover, deduplication protocol engine 118 may also be configured to receive a stream of data, and may be further configured to reduce or minimize redundancies in the received data. As similarly discussed above, deduplication protocol engine 118 may be configured receive an incoming data stream, identify duplicate copies of repeated data within a received data stream, and generate an output data stream by removing at least some of the identified duplicate data. Accordingly, as illustrated by deduplication protocol engine 106 and deduplication protocol engine 118 shown in FIG. 1, a deduplication protocol engine may be implemented within deduplication repository 102, or in another portion of a system that includes deduplication repository 102.

In various embodiments, client machine 104 may be communicatively coupled to various other components, such as deduplication protocol engine 106 and/or deduplication repository 102 as well as deduplication protocol engine 118 included within deduplication repository 102. Client machine 104 may be configured to communicate with such clients via one or more communications interfaces, such as communications protocol interface 114 and network 120. As will be discussed in greater detail below, client machine 104 may be configured to be implemented as a test machine capable of heavy testing of deduplication repository 102. Accordingly, client machine 104 may be specifically configured to generate data streams of data to be deduplicated that may be provided to deduplication protocol engines and deduplication repository. Such data may be used to generate file systems exceeding multiple terabytes that may be used to test repositories, such as deduplication repository 102, that may be capable of storing multi-terabyte backups. In some embodiments, client machine 104 may include output generator 220 which may be configured to rapidly generate requested data associated with a file system to be deduplicated and backed up in deduplication repository 102. For example, output generator 220 may include a buffer coupled to memory that may be zeroed out and modulated to generate an output data stream. In such an example, as will be discussed in greater detail below, read speeds experienced by deduplication protocol engines and deduplication repository 102 are greatly increased relative to a conventional file system that may read data from hard drives populated with data.

Although FIG. 1 shows a single client machine 104 and deduplication protocol engine 106, other arrangements or configurations may include any number of client machines and deduplication protocol engines.

According to various embodiments, client machine 104 and deduplication protocol engine 106 may communicate with deduplication repository 102 via communications protocol interfaces 114 and 116. Client machine 104 and deduplication protocol engine 106 may employ the same communications protocol interface or may employ different communications protocol interfaces. The communications protocol interfaces 114 and 116 shown in FIG. 1 may function as channel protocols that include a file-level system of rules for data exchange between computers. For example, a communications protocol may support file-related operations such as creating a file, opening a file, reading from a file, writing to a file, committing changes made to a file, listing a directory, creating a directory, etc. Types of communication protocol interfaces that may be supported may include, but are not limited to: Network File System (NFS), Common Internet File System (CIFS), Open Storage (OST), Web Distributed Authoring and Versioning (WebDAV), File Transfer Protocol (FTP), Trivial File Transfer Protocol (TFTP).

In some implementations, client machine 104 may communicate with a networked storage system and/or deduplication repository using the NFS protocol. NFS is a distributed file system protocol that allows a client computer to access files over a network in a fashion similar to accessing files stored locally on the client computer. NFS is an open standard, allowing anyone to implement the protocol. NFS is considered to be a stateless protocol. A stateless protocol may be better able to withstand a server failure in a remote storage location such as deduplication repository 102. NFS also supports a two-phased commit approach to data storage. In a two-phased commit approach, data is written non-persistently to a storage location and then committed after a relatively large amount of data is buffered, which may provide improved efficiency relative to some other data storage techniques.

In some implementations, client machine 104 may communicate with a networked storage system and/or deduplication repository using the CIFS protocol. CIFS operates as an application-layer network protocol. CIFS is provided by Microsoft of Redmond Wash. and is a stateful protocol.

In some embodiments, client machine 104 may communicate with a networked storage system and/or deduplication repository using the OST protocol provided by NetBackup.

In some embodiments, client machines on the same network may communicate via different communication protocol interfaces. For instance, one client machine may run a Linux-based operating system and communicate with a networked storage system and/or deduplication repository via. NFS. On the same network, a different client machine may run a Windows-based operating system and communicate with the same networked storage system and/or deduplication repository via CIFS. Then, still another client machine on the network may employ a NetBackup backup storage solution and use the OST protocol to communicate with deduplication repository 102.

According to various embodiments, virtual file system layer (VFS) 112 is configured to provide an interface for client machines using potentially different communications protocol interfaces to interact with protocol-mandated operations of deduplication repository 102. For instance, the virtual file system 112 may be configured to send and receive communications via NFS, CIFS, OST or any other appropriate protocol associated with a client device.

In some implementations, the network storage arrangement shown in FIG. 1 may be operable to support a variety of storage-related operations. For example, client machine 104 may use communications protocol interface 114 to provide data for storage in deduplication repository 102, or access and read files stored in deduplication repository 102. As another example, the deduplication protocol engine 106 may use the communications protocol interface 116 to create a file on the deduplication repository 102, to read data from the file, and to close the file.

In particular embodiments, communications protocol interface 114 may be configured to perform various techniques and operations described herein. For instance, a customized implementation of an NFS, CIFS, or OST communications protocol interface may allow more sophisticated interactions between a client device and a networked storage system and/or deduplication repository.

According to various embodiments, a customized communications protocol interface may appear to be a standard communications protocol interface from the perspective of the client device. For instance, a customized communications protocol interface for NFS, CIFS, or OST may be configured to receive instructions and provide information to other engines at the client device via standard NFS, CIFS, or OST formats. However, the customized communications protocol interface may be operable to perform non-standard operations such as a client-side data deduplication.

Figure 2:
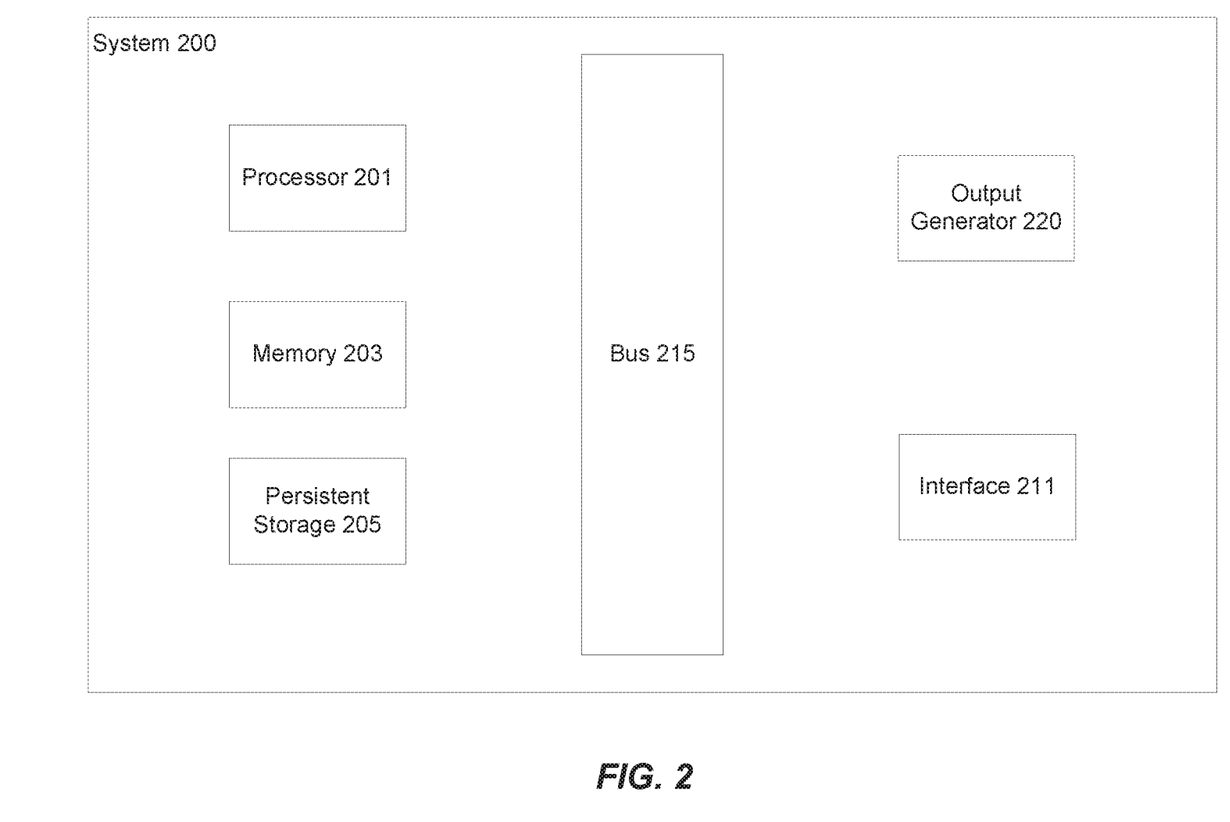
FIG. 2 illustrates a particular example of a system or device that can be used in conjunction with the techniques and mechanisms of the present disclosure.

FIG. 2 illustrates a particular example of a system or device that can be used in conjunction with the techniques and mechanisms of the present disclosure. According to particular example embodiments, a system 200 suitable for implementing particular embodiments of the present disclosure includes a processor 201, a memory 203, an interface 211, persistent storage 205, and a bus 215 (e.g., a PCI bus). For example, the system 200 may act as a client machine such as client machine 104 shown in FIG. 1. When acting under the control of appropriate software or firmware, the processor 201 is responsible for such tasks such as generating instructions to store or retrieve data on a remote storage system. Various specially configured devices can also be used in place of a processor 201 or in addition to processor 201. The complete implementation can also be done in custom hardware. The interface 211 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 205 may include disks, disk arrays, tape devices, solid-state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 200 uses memory 203 to store data and program instructions for operations such as fingerprint generation. The program instructions may control the operation of an operating system and/or one or more applications, for example. The memory or memories may also be configured to store received metadata and batch requested metadata. In some embodiments, the system 200 may act as a networked storage system such as deduplication repository 102 shown in FIG. 1. Moreover, as discussed above, system 200 may be configured to include an output generator, such as output generator 220.

Figure 3:
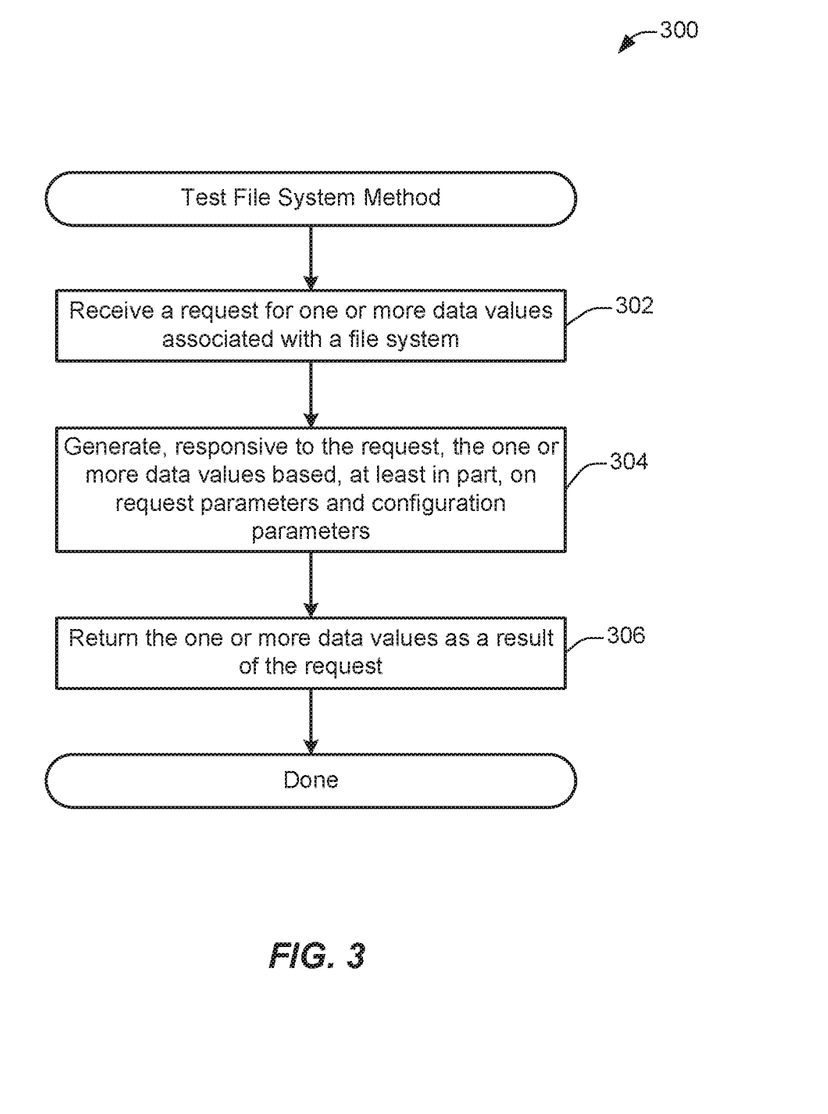
FIG. 3 illustrates a flow chart of an example of a method for using a test file system, implemented in accordance with some embodiments.

FIG. 3 illustrates a flow chart of an example of a method for using a test file system, implemented in accordance with some embodiments. As will be discussed in greater detail below, a method, such as method 300, may be implemented to test performance metrics associated with a deduplication repository while reducing an overall time and computational resource cost associated with the testing process.

Method 300 may commence with operation 302 during which a request for one or more data values may be received. In various embodiments, the request may be associated with a file system that may be a test file system. Accordingly, as will be discussed in greater detail below with reference to FIGS. 4 and 5, the request may be for a particular block of data, and the request may be generated and issued as part of a test process associated with a deduplication repository. Accordingly, the request may be for a block of data included in a test file system, and may be issued during performance testing of the deduplication repository. In various embodiments, the request may include various request parameters that may identify a storage location of the one or more data values, as may be identified by a file, within the test file system.

Method 300 may proceed to operation 304 during which the one or more data values may be generated based on the plurality of request parameters and a plurality of configuration parameters. As will be discussed in greater detail below with reference to FIGS. 4, 5, 6, and 7, the plurality of configuration parameters may enable deterministic generation of all data values stored in the file system. Accordingly, the data values associated with the test file system may be generated dynamically, on-the-fly, and in response to the request received at operation 302. In this way, time intensive population of the test file system within a system component, such as a client machine, is not utilized, thus reducing overall time and computational resources utilized by the testing of the deduplication repository.

Method 300 may proceed to operation 306 during which the one or more data values may be returned as a result of the request. Accordingly, a system component, such as a client machine, may be configured to provide the one or more data values to another system component, such as a deduplication repository, for storage as part of a deduplication and backup process or operation. As an example, a tool such as Linux TAR may crawl and read the test file system and generate a backup stream that is made available to the deduplication repository via communications protocol interface 114. As will be discussed in greater detail below, such generation and storage of data may be performed for the entire test file system, and the stored backup within the deduplication repository may be subsequently verified to assess various performance metrics associated with the deduplication repository.

Figure 4:
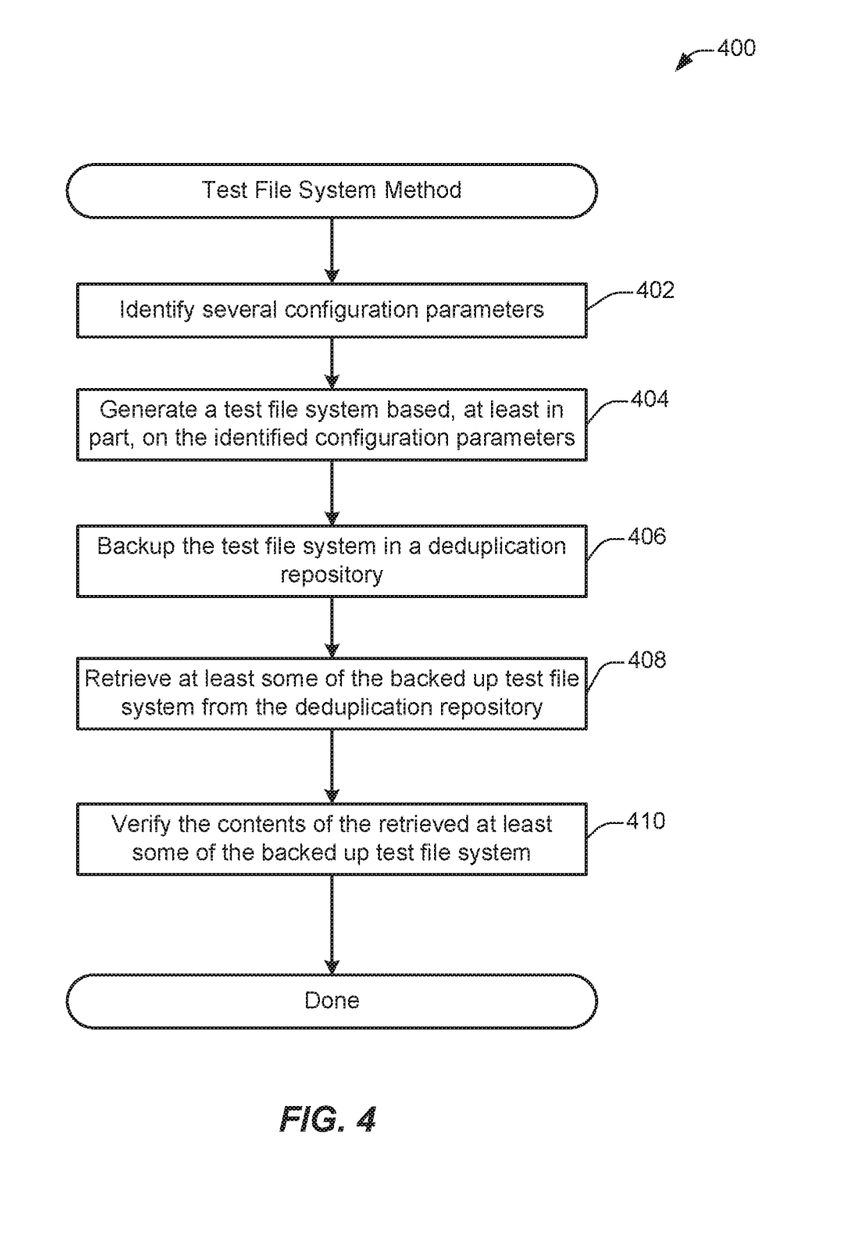
FIG. 4 illustrates a flow chart of another example of a method for performance and sanity testing of a deduplication repository, implemented in accordance with some embodiments.

FIG. 4 illustrates a flow chart of another example of a method for performance and sanity testing of a deduplication repository, implemented in accordance with some embodiments. As will be discussed in greater detail below, a test file system may be configured and may be used for the basis of a backup copy generated and stored by a deduplication repository. Portions of the backup copy, or the entire backup copy itself, may subsequently be analyzed and compared against the contents of the test file system to verify its accuracy and assess a performance of the deduplication repository during an ingest process (as may occur when implementing the deduplication and backup process). Moreover, as will be discussed in greater detail below, because the contents of the test file system may be generated dynamically, such performance testing of the deduplication repository may be implemented without the time and computational resource costs associated with populating a storage system with the contents of the test file system prior to the actual deduplication and backup operations performed by a deduplication repository under test.

Method 400 may commence with operation 402 during which configuration parameters may be identified. In various embodiments, the configuration parameters may be one or more parameters associated with a file system, such as a test file system, that may be used to configure the dynamic generation of data included in the test file system. For example, configuration parameters may include parameters that identify a particular compression ratio that may be achieved by a deduplication repository, such as deduplication repository 102, when data is backed up, a particular deduplication rate that will be achieved by 102 when the data is backed up. Configuration parameters may also identify a particular seed to be used for the test file system to ensure that the data generated is unique, as well as a total data size of the test file system. Accordingly, the configuration parameters determine how a test file system is created as well as how a deduplication repository under test backs up the test file system. In some embodiments, the configuration parameters may be designated parameters that are determined by an entity, such as a system administrator or a test engineer.

Method 400 may proceed to operation 404 during which a test file system may be generated. In some embodiments, the generation of the test file system may include creating a mount point within a storage system that may be included in or associated with a system component, such as a client machine. In various embodiments, the mount point may provide a link, connection, or interface between a storage system and an operating system. Accordingly, during operation 404, a mount point for the test file system may be created based, at least in part, on the configuration parameters, and the mount point may provide an application program interface between physical storage included in the client machine and a component trying to access the test file system, such as the deduplication repository. In various embodiments, the test file system may be implemented as a FUSE file system that may be configured to emulate a physical file system or hard drive. In various embodiments, such a FUSE file system may be emulated using a limited amount of random access memory (RAM) of the client machine. Accordingly, during operation 404, a mount point may be created for the test file system, where the mount point enables access to the test file system by other components, such as deduplication protocol engines and associated deduplication repositories. Moreover, during operation 404, the test file system may be configured to be emulated in RAM of system component, such as a client machine. In this way, the test file system may be configured and created without having to populate physical hard drives of a client machine with the entire contents of the test file system. Moreover, because operation 404 largely entails the generation of a mount point, operation 404 may be performed rapidly and in a relatively small amount of time when compared to the time utilized to populate physical hard drives of a client machine which may take hours or days As discussed above and in greater detail below, such time and computational savings may be accomplished because the test file system does not require any pre-population of data patterns and is able to deterministically generate data on the fly while also ensuring that when data is ingested into a deduplication repository, the resulting deduplication ratio and compression ratio are consistent with the configuration parameters provided during generation of the test file system.

Furthermore, according to some embodiments, during operation 404, the test file system and its associated components, such as a client machine, may be configured to implement and achieve features specified by the configuration parameters. For example, as will be discussed in greater detail below with reference to FIGS. 5, 6, and 7, a particular seed may be selected and associated with the test file system being implemented. Accordingly, the seed may be unique to the test file system being implemented. In some embodiments, the seed may be a file that includes a series of unique strings of data values that may form the basis of the dynamic generation of the test file system. Such seed files may be randomly generated. In various embodiments, one or more aspects of the data pattern that will be represented by the test file system may be configured based on the received configuration parameters. For example, a size and location of intervals included in the data pattern may be determined and configured based on a designated compressibility. In some embodiments, a mapping between strings of data values included in the seed and intervals included in the data pattern may also be determined. In various embodiments, such a mapping may be generated randomly. Furthermore, such a mapping may instead be determined dynamically as requested data values are generated responsive to data requests. Moreover, one or more wrapping boundaries associated with the data pattern may be determined based on a designated deduplication rate. Additional details of the determination and configuration of intervals and wrapping boundaries are discussed in greater detail below with reference to FIGS. 5, 6, and 7.

Method 400 may proceed to operation 406 during which the test file system may be backed up. Accordingly, as will be discussed in greater detail below with reference to FIGS. 5, 6, and 7, a system component, such as a backup application included in a deduplication protocol engine that may be backing up to a deduplication repository, may request data from the test file system to backup the contents of the test file system. Thus, during operation 406, the backup application (such as Linux TAR, Symantec NetBackup, or Commvault Simpana) backing up to a deduplication repository under test, may issue numerous requests for data units or blocks of data included within the test file system. A system component implementing the test file system dynamically generates the contents of each requested data unit or block. In this way, via the backup application, the contents of the test file system are propagated to the deduplication repository. The contents requested by the backup application to the test file system are dynamically generated, and the quality of the contents of the dynamically generated data blocks is determined based on the configuration parameters, which may include deduplication and compression ratios. The dynamically generated day may be provided to the deduplication repository which may perform one or more deduplication operations on the data prior to storing it as a backup copy of the test file system. When the backup application reads the test file system and propagates the backup stream to the deduplication repository, the speed of the backup is measured thereby enabling assessment of the overall performance of the deduplication repository. For example, a speed may be measured in megabytes (MBs) per second.

Method 400 may proceed to operation 408 during which the backed up test file system may be retrieved. Accordingly, during operation 408, one or more portions of the backed up data may be retrieved to compare the backed up data with the original data in the test file system and assess correctness or sanity of the deduplication repository in maintaining a backup of the data with high fidelity. In some embodiments, one or more portions of the backed up copy may be retrieved and compared with the test file system. In one example, one or more specific data files may be randomly selected and retrieved from the deduplication repository. Corresponding data files may again be dynamically generated by a client machine based on the previously described configuration parameters. Because the data included in the test file system is generated deterministically, as will be discussed in greater detail below with reference to FIG. 5, the data files initially provided to the deduplication repository during operation 406 and the data files dynamically generated for verification purposes may include the same data values.

Accordingly, during operation 408, one or more data files may be selected and retrieved from the deduplication repository, and their corresponding data files included in the test file system may again be dynamically generated for verification purposes, as will be discussed in greater detail below with reference to operation 410. In another example, a system component, such as a client machine, may subsequently recreate the entire test file system based on the same configuration parameters. The recreated file system may then be compared with the backed up copy stored within the deduplication repository. The entire recreated test file system may be compared with the backup in the deduplication repository as part of backed up copy verification testing. Accordingly, during verification operations, a first instance of the test file system may be generated based on the backed up data stored in the deduplication repository, and a deduplication protocol engine may reverse deduplication operations to generate a full fileset representative of the test file system that was initially received. Moreover, a second instance of the test file system may be dynamically generated by the client machine based on the received configuration parameters, and the second instance may be compared with the first instance for verification purposes.

Method 400 may proceed to operation 410 during which the test file system may be verified. Accordingly, the data values retrieved from the deduplication repository may be compared with their corresponding data values from the test file system which may be, as previously discussed, generated dynamically to ensure that the data values are the same. Accordingly, the sample of retrieved data files may be compared to their corresponding data files in the test file system, and one or more performance metrics may be generated based on the comparison. For example, a performance metric may be generated that characterizes an overall accuracy of the data retrieved and recreated by the deduplication repository. In another example, if the entire test file system is retrieved and recreated based on the backed up copy of the test file system stored in the deduplication repository, the entire contents of the recreated test file system may be compared against dynamically generated data values representing the test file system to assess a performance of the deduplication repository. In this way, data retrieved from and recreated by the deduplication repository may be checked against the contents of the test file system to assess a performance of the deduplication repository.

Figure 5:
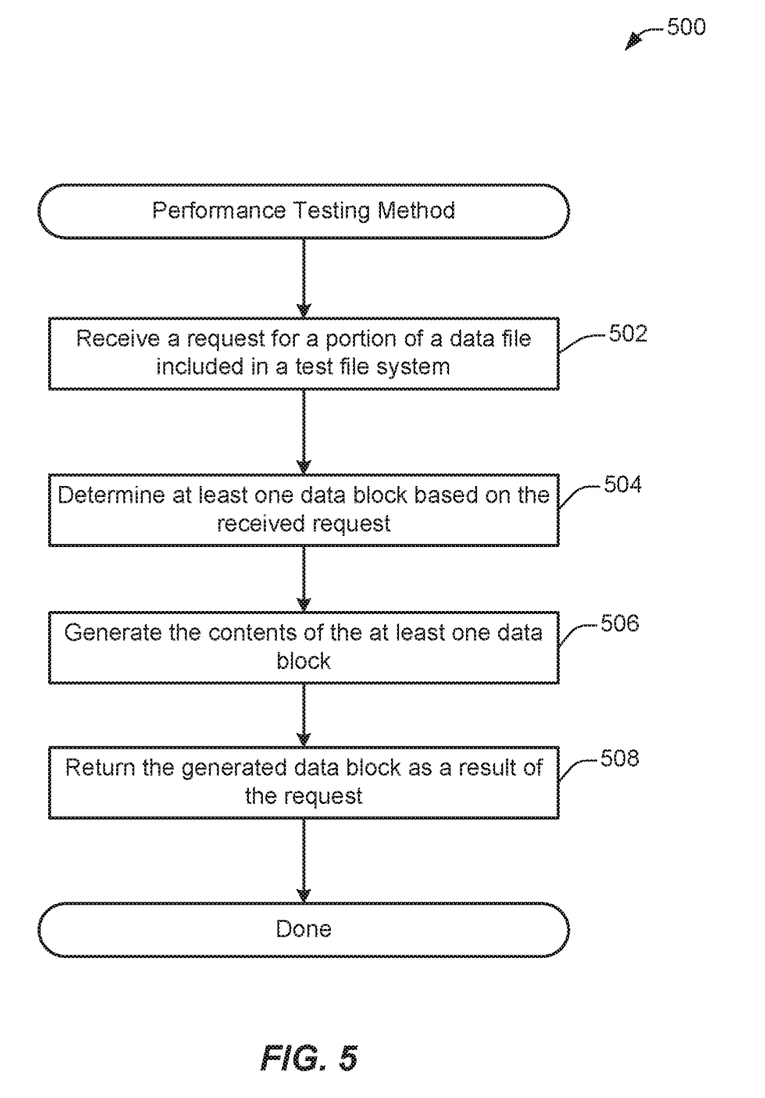
FIG. 5 illustrates a flow chart of yet another example of a method for performance testing of a deduplication repository using a test file system, implemented in accordance with some embodiments.

FIG. 5 illustrates a flow chart of yet another example of a method for performance testing of a deduplication repository using a test file system, implemented in accordance with some embodiments. As will be discussed in greater detail below, the contents of a test file system used to test the performance of a deduplication repository may be dynamically generated on-the-fly and in a deterministic fashion. In this way, the contents of the test file system may be rapidly generated and provided to the deduplication repository during a backup process, and may again be generated on demand and used to verify the backup copy. The test file system may be a read-only test file system that may assess the true performance of the deduplication repository by measuring the ingest performance during the backup of the files in the read-only test file system. As previously discussed, conventional techniques that first populate hard drives with a test file system are limited during the ingest process by read speeds of the physical disks. Accordingly, conventional techniques do not measure the true ingest performance of deduplication repositories. In contrast, embodiments as disclosed herein do not initially populate hard drives with the test file system and are not limited by the slow read performance of hard drives. Accordingly, embodiments as disclosed herein are able to measure a true performance of the deduplication repositories during ingest operations.

Method 500 may commence with operation 502 during which a request for a portion of a data file included in a test file system may be received. As discussed above, the request may be generated by a backup application that may read files from the read-only test file system and propagate as a backup stream to a deduplication repository that is being tested. Accordingly, each request to the file system may be for a portion of a data file (as may be identified by an offset, and a number of bytes), and such requests may be received numerous times for various portions of data files over the course of the backup to the deduplication repository. Thus, a request may include several request parameters that characterize or identify a relative offset within a particular file. More specifically, the request parameters may include an offset identifier which may specify a data offset, such as one or more bytes along with a total number of bytes to read. The request parameters may further include a data file identifier that specifies a particular data file for which data is being requested. Accordingly, the offset identifier may specify a data offset within the data file identified by the data identifier. In one example, the request parameters may identify a relative offset of 897 KB, and a length of 64 KB within a data file. In this way, specific portions of data values included in the test file system may be requested by the deduplication repository.

Method 500 may proceed to operation 504 during which a data block may be determined based on the received request. In various embodiments, a data block may be a unit of data within the test file system that represents a data file. For example, the test file system may be a data strip that includes several data blocks, each having a size and number determined based on a number of files and size of each file initially specified in the configuration parameters. Thus, a requested data file, and an offset associated with a data file, may be mapped to a data block within the data strip that represents or characterizes a data space or data map of all files as if they were placed in series or laid out back to back. The client machine implementing the test file system utilizes the data strip representation of the test file system to determine a simulated storage location associated with a data request. Thus, for a given offset, a data block may be generated on-the-fly. In this way, independent of how many times a particular request for a particular data block is made, the client machine implementing the test file system is able to generate the same data. In various embodiments, the sum total of the data associated with the data strip, when ingested into the deduplication repository, results in a deduplication ratio in the deduplication repository, which may be consistent with the deduplication ratio provided in the configuration parameters at the time of creating the read-only test file system.

Method 500 may proceed to operation 506 during which contents of the data block may be generated. In various embodiments, the contents of the data block determined during operation 504 may be dynamically generated during operation 506. Accordingly, a system component, such as a client machine, may be configured to generate the data values included in the data block on-the-fly. In various embodiments, the generation of the contents of the data block may be performed based, at least in part, on the configuration parameters. Moreover, the data block may be generated deterministically such that, given the same initial parameters or inputs, the same data values would be generated. Thus, according to some embodiments, a deterministic function may be utilized to generate the data values that form the contents of the data block. More specifically, the deterministic function may receive various parameters as inputs, and may generate data values that form the contents of the data block as an output. Additional details of the implementation of such a deterministic function are discussed in greater detail below with reference to FIG. 6 and FIG. 7.

In some embodiments, the deterministic function may receive a first set of parameters as an input. The first set of parameters that may be configured to define characteristics of the data values. For example, the first set of parameters may include a designated compression ratio and a designated deduplication rate. Thus, the first set of parameters may be configured to determine compressibility and duplicity of the data values included in a data block being generated. The deterministic function may also receive a second set of parameters as an input. The second set of parameters may be configured to provide randomization to the data values within the data block. For example, the second set of parameters may identify a seed and a data block number. In various embodiments, the seed and the data block number form the basis of the data values generated for a given data block. For example, the data values generated for a given data block may be based on the seed and the data block number as implemented in accordance with the compression ratio and deduplication rate specified above. Thus, the seed and data block number may be used to generate the data values included in various data blocks as well as provide randomized variance among data values included in different data blocks. In some embodiments, one or more of the configuration parameters, such as the first and second set of parameters, may be randomly selected. For example, a value of or a particular seed may be randomly selected.

Moreover, seeds may be implemented specific to particular test file systems. Thus, if numerous test file systems are implemented to perform different tests on one or more deduplication repositories, the use of different seeds may provide variation amongst data values between test file systems. As discussed above, the generation of the data values within a data block may be deterministic. Thus, when data values are generated responsive to a request, or subsequently during a verification process, the data values for a particular file system may be consistent among different iterations of the generation of data values, thus enabling the dynamic generation of such data values of a test file system without the population of a storage system with the actual data values of the test file system. The generation of data values is discussed in greater detail below with reference to FIG. 6.

As discussed above, generation of the data values may be accomplished via selectively zeroing out and modifying values stored in a buffer allocated from the memory of a client device.

Method 500 may proceed to operation 508 during which the generated data block may be returned as a result of the request. Accordingly, the dynamically generated contents of the data block may be returned as the contents of the requested data file via an output data stream of a system component, such as a client machine. The returned data file is propagated to the deduplication repository by the backup application and may then be processed by the deduplication repository and stored as part of a backup copy of the test file system. As previously discussed, such a stored copy of the test file system may be subsequently retrieved and compared.

Figure 6:
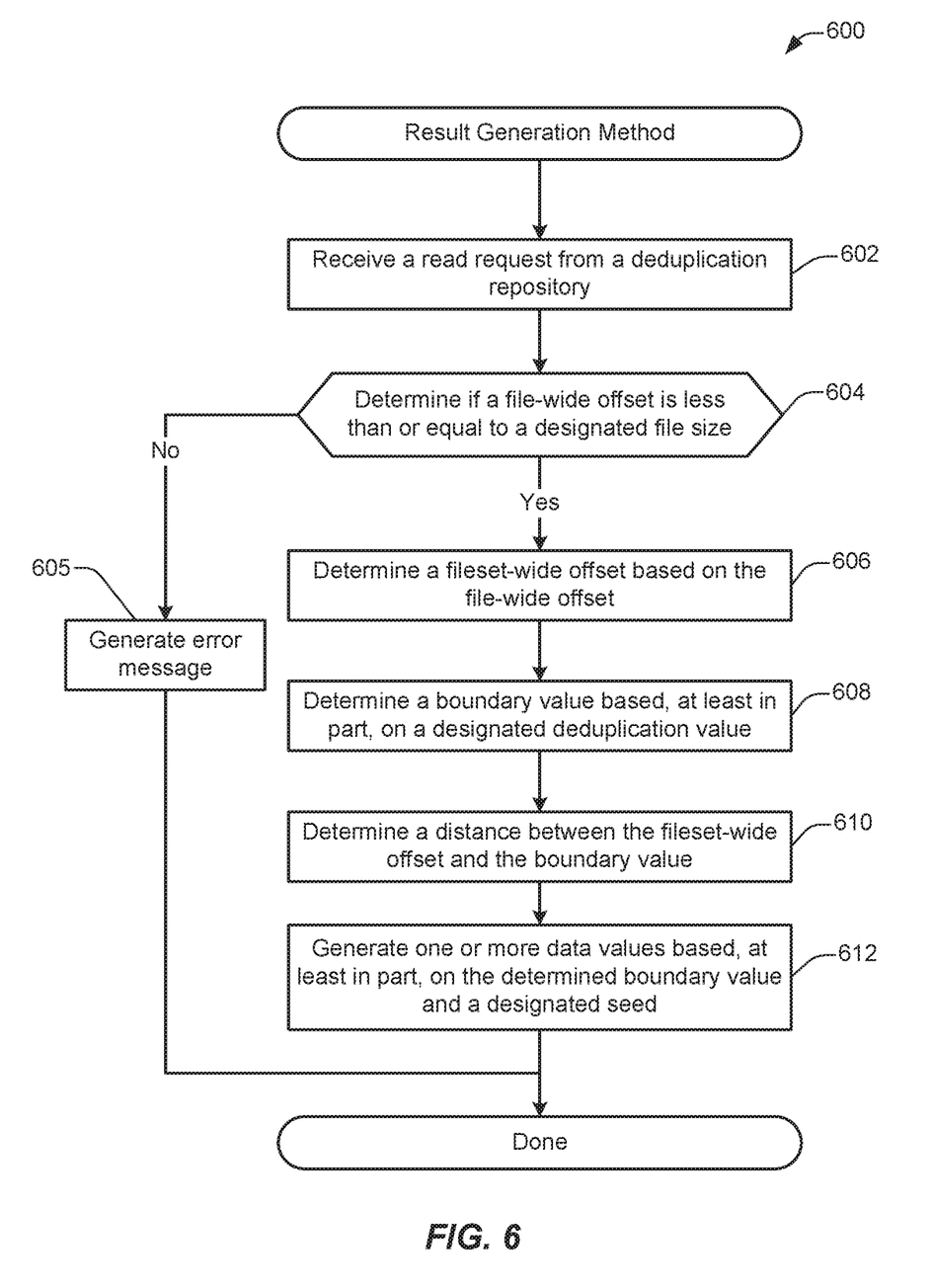
FIG. 6 illustrates a flow chart of an example of a method for generating a result responsive to a read request associated with a test file system, implemented in accordance with some embodiments.

FIG. 6 illustrates a flow chart of an example of a method for generating a result responsive to a read request associated with a test file system, implemented in accordance with some embodiments. Such a method may be implemented to generate data values having a same quality of data regardless of an offset order that read requests may be received in. The generation of such data may be based on a specified deduplication percentage, which may be specified during the time of test file system's mounting/creation. The deduplication percentage is across all files included in the fileset represented by the test file system. Accordingly, all of the files emulated by the test file system are ingested by a deduplication repository to test the deduplication percentage when stored in the deduplication repository. As discussed above, when the test file system representing a fileset is created, a number of tiles (n) in the fileset, a file size (s) of each file in the fileset, a deduplication percentage (p), a compressibility (high, low, medium), and a seed unique to the test file system, may be specified.

Method 600 may commence with operation 602 during which a read request may be received. As discussed above, a read request may be received from a system component, such as a deduplication repository, or one of its components. The request may specify a file descriptor, a buffer, a size of data requested, and a file-wide offset associated with the requested data. In various embodiments, the file descriptor may identify a specific file that includes the requested data. The buffer may be a pointer to memory where the requested data will be stored. The file-wide offset may be specific to a particular file that includes the requested data, and the file-wide offset may identify an offset from a beginning of the file at which the requested data begins. The size may identify a size of the requested data, and may be specified in a unit such as bytes.

Method 600 may proceed to operation 604 during which it may be determined if the file-wide offset is less than or equal to the designated file size. If the file-wide offset is not less than or equal to the designated file size, method 600 may proceed to operation 605 during which an error message may be generated and provided to the requesting entity that generated the request received during operation 602. Such a request may indicate that the requested data does not exist. If it is determined that the file-wide offset is less than or equal to the designated file size, method 600 may proceed to operation 606.

Accordingly, method 600 may proceed to operation 606 during which a fileset-wide offset may be determined based on the previously received file-wide offset. Accordingly, a second offset value may be determined that identifies an offset from a beginning of the entire fileset. Accordingly, if all files in the fileset were arranged serially or back-to-back, the fileset-wide offset may identify where the requested data begins relative to the entire fileset. Such a fileset-wide offset may be determined based on equation 1 below in which "foffset" represents a fileset-wide offset, "fd" represents a file identifier or number, "s" represents a size of each file (which may be specified in megabytes (MB) and may be determined by multiplying a number "s" by a number of MBs), and "offset" represents a file-wide offset:

$$f\text{offset}=((fd-1)*(s))+\text{offset} \qquad (1)$$

Method 600 may proceed to operation 608 during which one or more boundary values may be determined. In various embodiments, a boundary value may be a wrapping boundary which may be determined based on the designated deduplication value, which may be a percentage or ratio. In some embodiments, the wrapping boundary may be determined by multiplying a total size of the fileset by a numerical representation of the deduplication value. For example, for a test file system representing a fileset having a size of 200 MB and a designated deduplication percentage of 50%, the wrapping boundary may be determined by multiplying 200 by 0.5 to determine 100 MB should be the wrapping boundary. Accordingly, unique data values may be generated from 0-100 MB, and the same values may be generated from 100-200 MB within the fileset, thus achieving the specified 50% deduplication (half of the data is the same or redundant). More specifically, if these data values were ingested by a deduplication repository, it would result in 50% deduplication in which the first 100 MB is unique, and the second 100 MB is same as the first 100 MB. Accordingly, ingestion in the deduplication repository may result in 100 MB stored of unique data, and 50% deduplication. In this way, the boundary value may specify one or more points or locations within the total fileset, and may define a boundary that bounds the dynamically generated data pattern. As discussed in greater detail below, according to some embodiments, there may be three wrapping boundaries for a particular test file system.

It will be appreciated that multiple implementations of such boundary values are contemplated and disclosed herein. For example, a designated deduplication ratio of 25% may be implemented by determining a wrapping boundary at about 75% of the data values represented by the fileset. Thus, a first portion of the fileset may be configured to represent a data pattern, and a second portion of the fileset may be configured repeat about a third of the data pattern. Thus, in this example, when the first and second portions are viewed together, about 25% of the data is redundant thus achieving the deduplication percentage of 25%. Additional details of data patterns represented by test file systems are discussed in greater detail below with reference to FIG. 7.

Method 600 may proceed to operation 610 during which a distance from the fileset-wide offset to a boundary value may be determined. In various embodiments, the distance may be referred to herein as a boundary offset that identifies an offset of the requested data location from a particular boundary. Accordingly, the boundary offset may identify a location of requested data values relative to a specific boundary value which may have been determined during operation 608. In various embodiments, the boundary offset may be determined by first identifying the nearest boundary value that is less than the fileset-wide offset, and subtracting that nearest boundary value from the fileset-wide offset.

Figure 7:
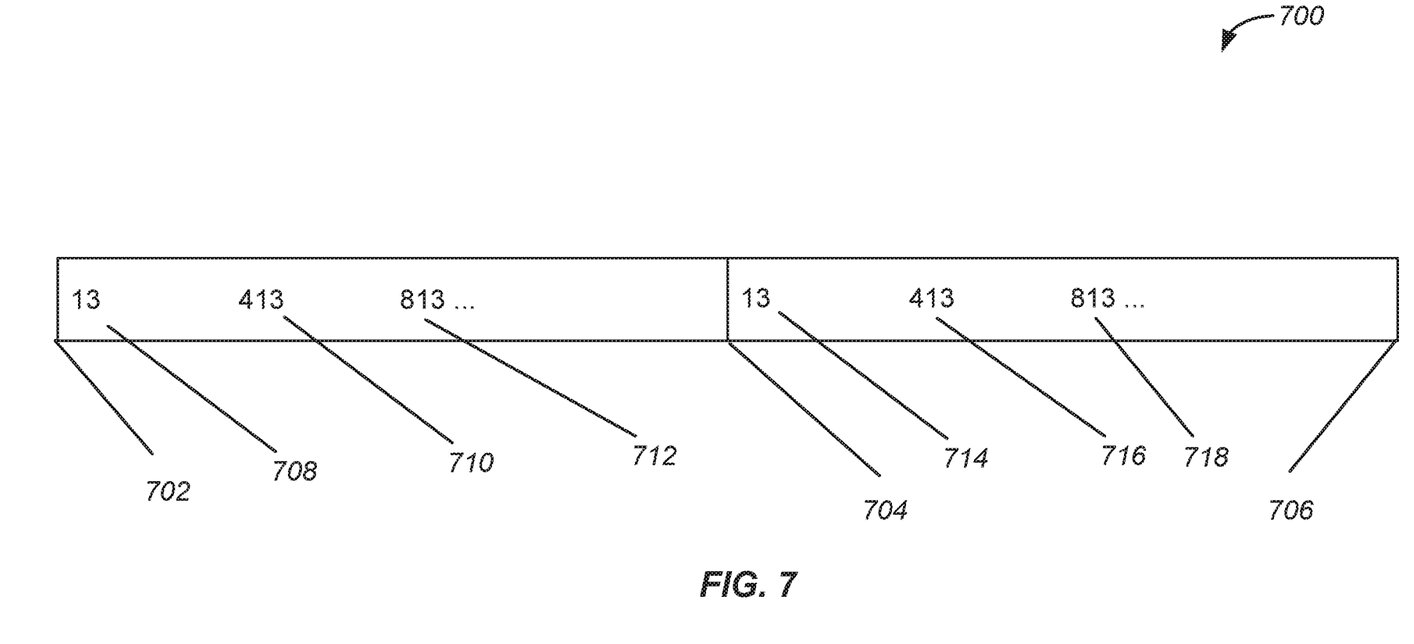
FIG. 7 illustrates a diagram of an example of a representation of a test file system, implemented in accordance with some embodiments.

Method 600 may proceed to operation 612 during which the requested data values may be generated. In various embodiments, the requested data values may be generated based on the determined boundary offset, the size of the requested data, and the designated seed. As shown in FIG. 7 and discussed in greater detail below, a test file system that represents several files may be configured such that a dynamically generated data pattern may include a unique set of data values at designated intervals throughout the data pattern bounded by the determined wrapping boundaries. Accordingly, during operation 612, it may be determined if the requested data values are at a location that is the same as a particular interval. If the requested data values do fall on a particular interval, the data values associated with that interval may be generated based on the designated seed, and may be returned as a result of the request. In some embodiments, the result may be trimmed or filled with spacer values, such as zeros, to match the size of the requested data. If the requested data values do not fall on a particular interval, a designated value may be returned as a result. The designated value may be a default value, such as zero. As has been discussed previously, the generation of the data values may be implemented dynamically and responsive to the request, and in a deterministic fashion.

Thus, according to some embodiments, a given boundary offset may be mapped to one or more data values based, at least in part, on the designated seed. For example, at a boundary offset of 1024 bytes, a particular portion of the seed file may be looked up, and may be used to generate a series of bytes encoding the value 413. This series of data values may be unique to this boundary offset within a particular file, and may be determined deterministically. For example, that boundary offset may always be mapped to 413 and only 413 for this particular data pattern and test file system. As discussed above, such a mapping of boundary offsets and intervals to data values in a seed may be determined during a configuration of the test file system, or may be determined dynamically during the data generation process by randomly and uniquely assigning strings of data values to boundary offsets and intervals.

In various embodiments, the size of the intervals underlying a data pattern may be configured to implement a particular compressibility value or ratio. For example, the intervals may be 64, 1024, or 4096 bytes wide. More specifically, a low compressibility may include smaller intervals, such as 64 bytes, and consequently fewer zeroes and more unique data values generated based on the seed. Similarly, a medium compressibility may include medium sized intervals, such as 1024 bytes, and a high compressibility may include larger intervals, such as 4096 bytes. While these examples of sizes have been discussed herein, it will be appreciated that any suitable range of sizes may be implemented.

As discussed in greater detail below, when implemented this way, other data values may be filled with blank data values such as zeroes. For example, all data values other than the unique data vales generated based on the seed may be zero. Representing the file system in this way may generate a sparse data pattern that may be beneficial and facilitate performance testing of the deduplication repository under test. Accordingly, the generated data values may be generated and returned in response to the request for data values that was initially received.

FIG. 7 illustrates an example of a representation of a test file system, implemented in accordance with some embodiments. As discussed above, the test file system may be a simulated tile system that simulates a fileset included in the file system that has a simulated number of tiles each of a particular size, thus simulating a file system having a total size. As shown in FIG. 7, a data pattern, such as data pattern 700, may be dynamically generated responsive to data requests for data from a test file system as discussed above. In some embodiments, data pattern 700 may include wrapping boundaries such as first wrapping boundary 702, second wrapping boundary 704, and third wrapping boundary 706. First wrapping boundary 702 may represent the beginning of data pattern 700, and the beginning of the fileset represented by the test file system. Second wrapping boundary 704 may represent a point at which data values included in the data pattern begin to repeat, as will be discussed in greater detail below. Accordingly, a location of second wrapping boundary 704 within the data pattern may be configured to implement a particular deduplication ratio or percentage. Third wrapping boundary 706 may represent a termination or end of the data pattern and an end of the fileset represented by the test file system.

As shown in FIG. 7, data pattern 700 may include several data values at various intervals. For example, a first data value 13 may be associated with first interval 708, a second data value 413 may be associated with second interval 710, and a third data value 813 may be associated with third interval 712. While not shown, additional data values may be associated with additional intervals throughout data pattern 700. Data values in between the first, second, and third data values as well as other data values associated with other intervals may be designated values such as zeros. As shown in FIG. 7, once the data values in data pattern 700 start repeating at, for example, second wrapping boundary 704, the same data values 13, 413, and 813, may be associated with additional fourth, fifth, and sixth intervals 714, 716, and 718.

Moreover, as discussed above, a size of the intervals may be configured or determined based on a designated compressibility ratio. For example, intervals may be configured to be 1024 bytes in size. In such an example, first interval 708 may have a boundary offset of 0 bytes, second interval 710 may have a boundary offset of 1024 bytes, and third interval 712 may have a boundary offset of 2048 bytes. Similarly, once the data pattern begins to repeat at second wrapping boundary 704, fourth interval 714 may have a boundary offset of 0 bytes, fifth interval 716 may have a boundary offset of 1024 bytes, and sixth interval 718 may have a boundary offset of 2048 bytes. In other examples, such intervals may be configured at increments of other byte widths such as 64 bytes or 4096 bytes to implement other levels or ratios of compressibility. As discussed above, the interstitial data values in between the unique data values may be data values having a designated value, such as zero. In this way, the insertion of such data values may increase compressibility by a desired amount.

As also discussed above, the data values associated with the intervals may be determined based on a seed, which may be used to dynamically generate a unique set of data values in a deterministic fashion. For example, in response to receiving a request for data values at a boundary offset of 1024, a unique set of data values may be deterministically generated for that boundary offset and returned as a result. In this example, the data values may be 413. Similarly, in response to receiving a request for data values at a boundary offset of 2048, another unique set of data values, such as 813, may be deterministically generated and returned as a result. Requests for data values that are for boundary offsets that do not directly correspond with intervals may simply return data values of a designated value, such as zero. Therefore, while data pattern 700 is shown in FIG. 7 for illustration purposes, such a data pattern is generated dynamically. Accordingly, individual data values are generated dynamically and deterministically as they are requested, and population of the entire file system prior to testing is not required.

Although many of the components and processes are described above in the singular for convenience, it will be appreciated by one of skill in the art that multiple components and repeated processes can also be used to practice the techniques of the present disclosure.

Because various information and program instructions may be employed to implement the systems/methods described herein, the present disclosure relates to non-transitory machine-readable media include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher-level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure.

What is claimed is:

1. A method, comprising:
receiving a set of configuration parameters pertaining to creating a simulated file system to configure dynamic generation of data in the simulated file system, wherein the set of configuration parameters identify a compression ratio, a deduplication rate, and a total data size associated with the simulated file system;
generating the simulated file system by generating a mount point within a storage system, wherein the mount point enables access to the simulated file system by other components, including a deduplication protocol engine and a deduplication repository;
generating test data for the simulated file system based on the set of configuration parameters, the simulated file system configured to simulate a file system that is larger than the simulated file system, wherein the configuration parameters include a seed file that includes a series of unique strings of data values that form a basis of the dynamic generation of data in the simulated file system;
identifying a storage location in which to store the test data;
causing the test data to be stored and deduplicated in the simulated file system;
retrieving at least a portion of the test data in the simulated file system;
recreating the deduplicated test data; and
verifying the recreated test data of the simulated file system prior to or in place of populating an entirety of the file system.

2. The method of claim 1, wherein the test data are generated dynamically and based on a seed specific to the simulated file system.

3. The method of claim 2, wherein the test data are generated utilizing a deterministic function.

4. The method of claim 3, wherein the deterministic function is configured based on a designated deduplication rate and a designated data offset associated with the simulated file system.

5. The method of claim 4, wherein the deterministic function is configured to generate the test data based on the compression ratio, the deduplication rate, and the seed.

6. The method of claim 1 further comprising:
receiving the set of configuration parameters at a client machine.

7. The method of claim 1, wherein at least some of the set of configuration parameters are randomly selected.

8. A device, comprising:
a communications interface communicatively coupled with a deduplication repository; and one or more processors configured to implement a simulated file system, the one or more processors being configured to:
receive a set of configuration parameters pertaining to creating the simulated file system to configure dynamic generation of data in the simulated file system, wherein the configuration parameters include a seed file that includes a series of unique strings of data values that form a basis of the dynamic generation of data in the simulated file system, wherein the set of configuration parameters identify a compression ratio, a deduplication rate, and a total data size associated with the simulated file system;
generate the simulated file system by generating a mount point within a storage system, wherein the mount point enables access to the simulated file system by other components, including a deduplication protocol engine and a deduplication repository;
generate test data for the simulated file system based on the set of configuration parameters, the simulated file system configured to simulate a file system that is larger than the simulated file system;
identify a storage location in which to store the test data;
cause the test data to be stored and deduplicated in the simulated file system;
retrieve at least a portion of the test data in the simulated file system;
recreate the deduplicated test data; and
verify the recreated test data of the simulated file system prior to or in place of populating an entirety of the file system.

9. The device of claim 8, wherein the test data are generated dynamically and based on a seed specific to the simulated file system.

10. The device of claim 9, wherein the test data are generated utilizing a deterministic function, wherein the deterministic function is configured to generate the test data based on the compression ratio, the deduplication rate, and the seed.

11. The device of claim 10, wherein the deterministic function is configured based on a designated deduplication rate and a designated data offset associated with the simulated file system.

* * * * *